Oct. 19, 1926.

J. W. DOWNEY, JR.

PLURAL OBSERVATION SCOPE

Filed April 7, 1925

1,603,331

Patented Oct. 19, 1926.

1,603,331

UNITED STATES PATENT OFFICE.

JESSE W. DOWNEY, JR., OF BALTIMORE, MARYLAND, ASSIGNOR TO KLOMAN INSTRUMENT COMPANY, OF WASHINGTON, DISTRICT OF COLUMBIA, A CORPORATION OF THE DISTRICT OF COLUMBIA.

PLURAL-OBSERVATION SCOPE.

Application filed April 7, 1925. Serial No. 21,415.

My invention relates to a device for the plural observation of objects and is adapted for use in connection with scopic instruments. Although this device has been principally devised for use in conjunction with surgical diagnostic scopic instruments, it is nevertheless generally applicable to all types of scopes, including not only those falling within the surgical class, such as auriscopes, etc.; but also including its adaption in the class of distance scopes, such as telescopes, field glasses, opera glasses, etc.

A great need has been felt in the surgical and medical profession, for the past number of years, for some type of apparatus through which not only one, but two or even more may simultaneously see through one of the conventional diagnostic scopes now being used generally, for a more thorough and practical examination of defects hidden in cavities of the human body, and for the benefit of a more practical consultation upon the particular case.

An object of this invention is to provide a device through which one or more persons may visualize objects at the same time and for the purpose of consulting upon their details. A surgical professor may instruct his students thereby, or a commander at sea and his fellow officer may have the unusual position of visualizing the same object through the same scope without any inconvenience to either party.

Other objects and useful applications will become apparent in the following specification:—

Figure 1:
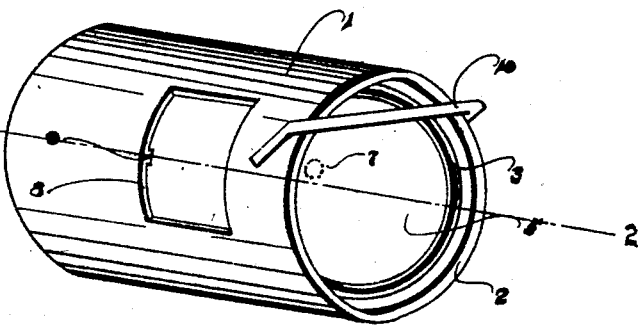
Figure 1 is a perspective view of the attaching end of the device.
Figure 2:
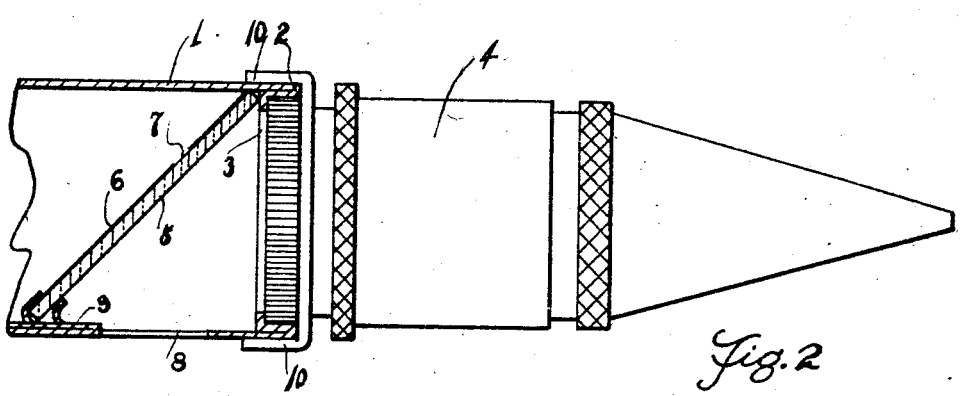
Figure 2 is a cross section on the line 2—2 of Figure 1, and showing its application to a conventional type of auriscope.

In the drawing for the purpose of illustration like numerals designate like parts. Numeral 1 is a suitable tube or casing having one of its ends rolled inwardly at 2, for the purpose of forming a flange 3, to be employed as an abutment when this device is in contact with some scopic instrument 4, which in the drawing is illustrated as that of an auriscope.

A mirror or reflector 5 having the conventional silvered back surface 6 is positioned within the device at the proper angle so as to cast an image visible through the auriscope at right angles to the line of observation. The said mirrored surface has a small portion of its silver coating removed at the point 7 to provide a peephole in alinement with the line of observation. The casing or tubing 1 has a suitable opening 8 struck from its side and on the face side of the mirror 5 for the purpose of providing a window through which one may see on the mirror an image reflected from along the line of observation. An integral retaining tongue 9 is formed from the casing 1 to provide a suitable fastening means for the angular set mirror 6. A hanger rod 10 extends across the rear end of this device adjacent the tube and having its extremities secured to the sides of the casing 1.

Figure 3:
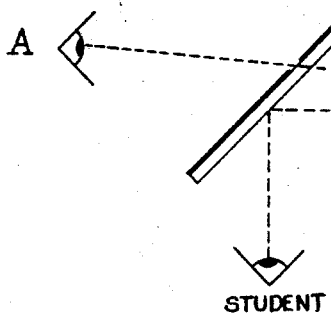
Figure 3 is a schematic view of the principles herein set out.

For illustration and hypothecation we will assume that in Figure 3 a surgical instructor is stationed at A and looking along the straight line of observation through the peephole 7 towards the object intended. Now we will take for instance the assistance of a consulting surgical or medical man who will have leave to see through the window 8 in the casing 1 the image on the mirror 5 reflected from along the line of observation. There will be seen that both the instructor and his assistant or student may both at the same time visualize the same object, the instructor seeing the object through the straight line of observation, while the student or the second party will see the identical image reflected on the mirror 5 from his position at the side of the device.

No particular structure is an absolute requisite to the practical employment of this method of observation, except for a suitable tube as has been illustrated by numeral 1, and a mirror 5 set at the proper angle. It will also be noted that the small peephole 7 is an important feature in connection with this invention as has already been set forth in the foregoing specification. Therefore, I do not wish to limit this invention to any specific structure, but that any structure desirable and proper for the execution of this method of observation can be employed so long as the scope of the invention is maintained.

Having described my invention what I claim as new and useful is:—

1. An attachment for scopic instruments comprising a tube opened at both ends and provided with an opening in its length adjacent its forward end, an annular flange formed within the tube at its forward end, a reflecting surface mounted within the tube and provided with a transparent pore therein, and means for attaching the whole to a conventional type of scopic instrument.

2. An attachment for scopic instruments comprising a tube opened at both ends and provided with an opening in its length adjacent its forward end, an annular flange formed within the tube at its forward end, a mirrored surface mounted within the tube and provided with a transparent pore therein, and a hanger rod located across the forward end of the tube adapted to grip the butt of a scopic instrument and retain same against the annular flange within the tube at its forward end.

3. An attachment for scopic instruments comprising a tube opened at both ends and provided with an opening in its length adjacent its forward end, an annular flange formed within the tube at its forward end, a mirrored surface mounted within the tube and provided with a transparent pore therein, a strip formed from the tube at the opening adjacent its forward end and adapted to be bent inwardly to engage the mirrored surface and secure same in an angular position in relation to the opening, and a hanger rod located across the forward end of the tube adapted to grip the butt of a scopic instrument and retain same against the annular flange within the tube at its forward end.

In testimony whereof I affix my signature.

JESSE W. DOWNEY, Jr.